United States Patent
Saarisalo

(10) Patent No.: US 11,275,826 B2
(45) Date of Patent: Mar. 15, 2022

(54) MANAGING APPLICATIONS RELATED TO SECURE MODULES

(75) Inventor: Mikko Antero Saarisalo, Kantvik (FI)

(73) Assignee: Nokia Technologies Oy, Espoo (FI)

( * ) Notice: Subject to any disclaimer, the term of this patent is extended or adjusted under 35 U.S.C. 154(b) by 441 days.

(21) Appl. No.: 12/525,279

(22) PCT Filed: Jan. 31, 2007

(86) PCT No.: PCT/FI2007/050052
§ 371 (c)(1),
(2), (4) Date: Oct. 28, 2009

(87) PCT Pub. No.: WO2008/092985
PCT Pub. Date: Aug. 7, 2008

(65) Prior Publication Data
US 2010/0050271 A1 Feb. 25, 2010

(51) Int. Cl.
*G06F 21/53* (2013.01)
*G06F 21/62* (2013.01)
(Continued)

(52) U.S. Cl.
CPC .............. *G06F 21/53* (2013.01); *G06F 21/50* (2013.01); *G06F 21/52* (2013.01);
(Continued)

(58) Field of Classification Search
CPC .... G06Q 30/207–0277; G06Q 30/0207–0277; G06F 21/50; G06F 21/52; G06F 21/53; G06F 21/6209; G06F 2221/2105; G06F 2221/2149; H04M 1/72522
(Continued)

(56) References Cited

U.S. PATENT DOCUMENTS 5,426,762 A * 6/1995 Nakagawa .................... 711/115
6,571,389 B1 5/2003 Spyker et al.
(Continued)

FOREIGN PATENT DOCUMENTS

EP 1193986 4/2002
EP 1225744 7/2002
(Continued)

OTHER PUBLICATIONS

White, Ron, "How Computers Work", Millennium Ed., Que Corporation, Indianapolis, IN, 1999.*
(Continued)

*Primary Examiner* — Abhishek Vyas
*Assistant Examiner* — Monica A Mandel
(74) *Attorney, Agent, or Firm* — Locke Lord LLP

(57) ABSTRACT

An apparatus capable of hosting a secure module. The hosting apparatus is configured to provide connectivity to the secure module, and comprises a memory for storing secure module related applications. A processing module is configured to check whether an application chosen or activated by the user of the apparatus is a secure module related application. In case the chosen or activated application is a secure module related application, the processing module is 101 configured to restrict user rights concerning the application.

13 Claims, 8 Drawing Sheets

(51) Int. Cl.
  *G06F 21/50* (2013.01)
  *G06F 21/52* (2013.01)
  *H04M 1/72403* (2021.01)

(52) U.S. Cl.
  CPC .. *G06F 21/6209* (2013.01); *G06F 2221/2105* (2013.01); *G06F 2221/2149* (2013.01); *H04M 1/72403* (2021.01)

(58) Field of Classification Search
  USPC .......................... 726/28; 705/59, 57, 67, 55
  See application file for complete search history.

(56) References Cited

U.S. PATENT DOCUMENTS

| | | | |
|---|---|---|---|
| 6,618,735 B1* | 9/2003 | Krishnaswami | G06F 8/65 |
| 6,883,718 B1 | 4/2005 | Le et al. | |
| 7,165,109 B2 | 1/2007 | Chiloyan et al. | |
| 7,278,582 B1* | 10/2007 | Siegel | G06F 21/72 |
| | | | 235/451 |
| 7,890,427 B1 | 2/2011 | Rao et al. | |
| 7,913,246 B2 | 3/2011 | Hammond et al. | |
| 2001/0042049 A1* | 11/2001 | Zucker et al. | 705/55 |
| 2001/0056462 A1 | 12/2001 | Kataoka | |
| 2002/0083228 A1 | 6/2002 | Chiloyan et al. | |
| 2004/0181416 A1* | 9/2004 | Lee et al. | 705/1 |
| 2004/0225690 A1* | 11/2004 | Arkeketa | G06F 21/604 |
| 2006/0080351 A1 | 4/2006 | Powell et al. | |
| 2006/0143606 A1* | 6/2006 | Smith | G06F 21/6218 |
| | | | 717/175 |
| 2006/0229027 A1 | 10/2006 | Wang et al. | |
| 2006/0237528 A1 | 10/2006 | Bishop et al. | |
| 2007/0006206 A1* | 1/2007 | Dhanjal | G06F 9/4443 |
| | | | 717/168 |
| 2007/0180527 A1* | 8/2007 | Yeom | 726/23 |
| 2008/0155257 A1* | 6/2008 | Werner | H04L 9/0844 |
| | | | 713/168 |
| 2009/0098825 A1 | 4/2009 | Huomo et al. | |
| 2009/0124251 A1 | 5/2009 | Niccolini | |
| 2010/0257614 A1* | 10/2010 | Ginter et al. | 726/28 |
| 2012/0196529 A1* | 8/2012 | Huomo | H04B 5/0031 |
| | | | 455/41.1 |

FOREIGN PATENT DOCUMENTS

| | | |
|---|---|---|
| EP | 1303153 A1 | 4/2003 |
| EP | 1455499 | 9/2004 |
| EP | 1462938 | 9/2004 |
| EP | 1551193 A1 | 7/2005 |
| GB | 2292047 A | 2/1996 |
| JP | 2001195238 | 7/2001 |
| JP | 2002-109427 | 4/2002 |
| JP | 2002111888 | 4/2002 |
| JP | 2002268983 | 9/2002 |
| JP | 2004-062265 | 2/2004 |
| JP | 2004297813 | 10/2004 |
| JP | 2006072956 | 3/2006 |
| JP | 2006-154997 | 6/2006 |
| JP | 2006519524 | 8/2006 |
| WO | 9925141 A1 | 5/1999 |
| WO | 2006040115 A1 | 4/2006 |
| WO | WO2006053835 | 5/2006 |
| WO | 20060120280 A1 | 11/2006 |
| WO | 2008028989 A1 | 3/2008 |

OTHER PUBLICATIONS

Atmel's New AT98SC032CT-USB for Embedded Systems and E-Tokens. (Nov. 8, 2006). AsiaPulse News. ProQuest. Retrieved on Oct. 23, 2021 from <https://dialog.proquest.com/professional/docview/671166455?accountid=131444>. (Year: 2006).*

International Search Report of the International Searching Authority for corresponding International Patent Cooperation Treaty Application PCT/FI2006/050383, dated May 31, 2007, 4 pages.

Written Opinion of the International Searching Authority for corresponding International Patent Cooperation Treaty Application PCT/FI2006/050383, dated May 31, 2007, 6 pages.

Supplemental European Search Report for corresponding European Application No. 06778566, dated Jun. 4, 2010, 2 pages.

Search Opinion for European Search Report for corresponding European Application No. 06778566, dated Jun. 4, 2010, 2 pages.

English Language Machine Translation of Japanese Patent Publication No. JP2006-154997—26 pages.

English Language Machine Translation of Japanese Patent Application Publication No. JP2004297813, 18 pages.

English Language Machine Translation of Japanese Patent Application Publication No. JP2006072956, 32 pages.

Extended European Search Report of EP Application No. 07704822.1—dated Jun. 13, 2016, 6 pages.

"Mobile Proximity Payment Issues and Recommendations—Mobile Payment Configuration and Maintenance", Mobile Payment Forum, Inc., 2006, server date Dec. 10, 2006; downloaded by EPO on Oct. 13, 2011, 88 pages.

Egeberg, M., "The mobile phone as a contactless ticket", Master Thesis of Science in Communication Technology, Norwegian University of Science and Technology, submitted Jun. 2006, retrieved from the Internet on Jun. 9, 2009, 115 pages.

Extended European Search Report for EP Patent Application No. 17167211.6, dated Jul. 7, 2017, 9 pages.

JSR 118 Expert Group, Java Community Process, 'Mobile Information Device Profile for JavaTM 2 Micro Edition', Sunmicrosystems, Inc. and Motorola, Inc., Nov. 5, 2002.

Ahonen P., et al., Information Security Threats and Solutions in the Mobile World, The Service Developer's Perspective. VTT Tiedotteita—Research Notes 2308, Helsinki 2005.

Debbabi, M., et al., Java for Mobile Devices: A Security Study, Computer Security Applications Conference, 21st Annual Tucson, AZ USA Dec. 5-9, 2005, Piscataway, NJ, USA, IEEE.

"International Search Report and The Written Opinion of the International Searching Authority", received in corresponding PCT Application No. PCT/FI2007/050052, dated Oct. 12, 2007, 12 pages.

* cited by examiner

335

| SE appln. ID | UI appln. name / ID | UI appln. version | UI appln. site / URL |
|---|---|---|---|
| #### ## # | #### ## # | #### ## # | #### ## # |
| #### ## # | #### ## # | #### ## # | #### ## # |
| #### ## # | #### ## # | #### ## # | #### ## # |

Fig. 4

MANAGING APPLICATIONS RELATED TO SECURE MODULES

FIELD OF THE INVENTION

The present invention relates to managing secure modules and secure module counterpart applications. More particularly, but not exclusively, the present invention relates to handling of counterpart applications which are dedicated to implement a certain function, such as a user interface, for secure module applications stored within a secure element or module.

BACKGROUND OF THE INVENTION

Traditionally, payment and/or ticketing applications have been residing on a secure chip embedded onto a credit card size plastic smartcard.

More recently, when contactless payment/ticketing have become more common, one has begun to install secure chips containing payment instruments and/or public transportation tickets into mobile devices, such as mobile phones. In one exemplary implementation a mobile device comprises a smartcard module and a near field communication module. The smartcard module may be a secure module which contains the required secure module application, e.g. the payment/ticketing application. The secure module application may be started by a user or automatically based on the context and/or location of the mobile device. For example, when the mobile device enters within the area of a point-of-sales terminal, the secure module application can start automatically. The near field communication module will be activated and subsequently a contactless payment transaction can be carried out.

The term near field communication in this context covers various short-range techniques and technologies which enable wireless communication between devices when they are touched together or brought close together. Accordingly, the term near field communication covers, among other things, various contactless close-to-touch connectivity technologies which involve electromagnetic and/or electrostatic coupling. The term covers the RFID (Radio Frequency IDentification) technology as well as the specific NFC (Near Field Communication) technology specified by following standardization bodies: NFC Forum, International Organization for Standards (ISO) and ECMA International.

Now that secure modules containing secure module applications are installed into electronic devices, such as, for example mobile phones this enables a convenient feature, namely the possibility to enable a user interface for providing the user of the phone with means to observe and control various applications stored in the secure module. The user interface of the mobile device can be used as a user interface for the secure module. Typically, this requires two applications: a first application (the secure module application) installed in the secure module to provide the security critical functionality, and a second application (a user interface application or another suitable counterpart application) installed into the mobile phone to provide the user interface for the first application and to control the first application in case an appropriate security level is provided. Having two distinct applications to provide the total functionality introduces a risk of those two getting out of sync thereby destroying proper operation.

In other words, whenever a situation arises in which the mobile device for some reason does not have the required counterpart application (here: user interface application) the user interface functionality will be disabled. This may occur, e.g., when the secure module is changed from one mobile device to another (if the latter does not contain the required application) or when the software of the phone is being updated.

As suggested in the international patent application PCT/FI2006/050383 by the inventor of the present application, this problem can be solved by arranging an apparatus hosting the secure module to check whether a compatible counterpart application is present in the apparatus. This can be done by taking advantage of a dedicated register or database arranged into the secure module. In case the compatible counterpart application is not present, the apparatus may obtain the compatible counterpart application from an outside source. When the compatible counterpart application has been updated there is however the risk that the user might either intentionally or unintentionally delete or uninstall the counterpart application, or otherwise ruin the proper operation of the counterpart application (for example by incorrectly manipulating counterpart application settings).

Deletion or removal in another way may be fine for some applications such as games or other stand-alone applications. Deletion or removal of a secure module counterpart application, e.g., said user interface application, however may cause severe impacts, at least on user experience. Without the user interface application, the user may not see the value of her value ticket, for example. The user may even draw the conclusion that her contactless ticket has been lost, even though it is still securely stored within the secure module.

SUMMARY

According to a first aspect of the invention there is provided an apparatus capable of hosting a secure module, the apparatus comprising:

a memory for storing secure module related applications; and a processing module configured to check whether an application is a secure module related application, wherein in case an application chosen or activated by a user of the apparatus is a secure module related application, the processing module is configured to restrict user rights concerning that application In an embodiment, the check whether the application is a secure module related application is performed before or after the actual choosing or activation.

In an embodiment, the secure module related applications are counterpart applications, such as secure module user interface applications. It is clear, however, that the applications are not restricted to user interface applications, but other applications, such as control or managing applications are applicable as well. In an embodiment a counterpart application is a compatible application residing in the (hosting) apparatus outside the secure module. In an embodiment, the counterpart application is an application which is designed to operate together with the secure element application. In an embodiment the counterpart application is an application providing a user interface for the secure module in a mobile station. In an embodiment the counterpart application is a control application controlling the operation of the secure module from outside. In another embodiment the counterpart application is another application managing the secure module.

In an embodiment, a user interface application registry is implemented into a secure smartcard element that contains an entry for each secure application stored in the secure smartcard element. In an embodiment, deletion protection of midlets relating to secure smartcard is implemented by way of marking the midlets relating to secure smartcard using the secure smartcard element application registry/directory.

In an embodiment, midlets acting as user interface for secure smart card module applications are handled by the hosting apparatus differently from regular applications or midlets.

In an embodiment, a secure module is powered during terminal powering operation and a processor of a secure module hosting apparatus reads information from the secure module during this time. The processor creates a sort of virtual file storing this information, wherein the virtual file information is updated whenever the secure module is powered. Then, whenever a midlet relating to the secure element is accessed, a pointer to the virtual file indicates whether the midlet can be amended via terminal user interface or not.

In an embodiment, a hosting apparatus, such as a mobile terminal or phone, implements a separate installation or application class for those hosting apparatus resident applications, which act as secure module application user interface or management applications. In this way the secure module related applications (such as user interface or management midlets) can be separated from regular applications. Based on the separation, restriction measures can be directed to applications comprises in the separate installation or application class.

A further embodiment is addressed to additional security domain based application protection. Midlets accessing mobile phone internal secure element may be required to have a specific Java Security Domain signature. Typically, the mobile phone recognizes Manufacturer, Operator, 3rd Party, and untrusted security domains. The first three require a recognizable certificate chain to be matching with mobile phone resident root certificates. When the midlet has been signed by a recognized certificate holder, the phone is able to grant specific permissions for the midlet. In an embodiment, a mobile apparatus or mobile phone implements an additional security domain based on root certificate resident on the apparatus or secure module. If the midlet has a signature matching this security domain, in an embodiment, the apparatus is adapted to apply user rights restriction measures based on this signature alone.

According to a second aspect of the invention there is provided a secure module capable to be hosted by a hosting apparatus, the secure module comprising:

a processing unit for installing a secure module application into the secure module, and a memory for storing an indication about a compatible counterpart application which is needed in the hosting apparatus, wherein the processing unit is configured to communicate said indication to the hosting apparatus, the indication causing the hosting apparatus to restrict user rights concerning said counterpart apparatus.

In an embodiment, the secure module is a secure smartcard chip which is in direct communication contact with a near field communication module or RFID communication module of the hosting apparatus enabling the use of secure module applications, such as contactless payment/ticketing applications.

In an embodiment, said indication is implemented by means of a registry in a secure smartcard element that contains an entry for secure application(s) stored in the secure smartcard element. The entry may contain data of any corresponding counterpart application required to be present in a hosting device. This data in itself can already be interpreted as an indication. Additionally, the registry may contain further data indicating that user right restriction measures should be applied concerning the counterpart application. Alternatively, the registry may contain an express indication that the counterpart application should be treated as "non-editable" or similar.

According to a third aspect of the invention there is provided a method, comprising:

checking by an apparatus capable of hosting a secure module whether an application is a secure module related application; and in case an application chosen or activated by a user of the apparatus is a secure module related application, restricting user rights concerning that application.

According to a fourth aspect of the invention there is provided a computer program (or software) stored in a computer readable medium, the computer program comprising computer executable program code adapted to cause an apparatus to perform the method of the third aspect.

According to a fifth aspect of the invention there is provided an apparatus capable of hosting a secure module, the apparatus comprising:

memory means for storing secure module related applications; and processing means configured to check whether an application is a secure module related application, wherein in case an application chosen or activated by a user of the apparatus is a secure module related application, the processing means are configured to restrict user rights concerning that application.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 4 illustrates a registry table according to an embodiment of the invention;

DETAILED SPECIFICATION

Figure 1:
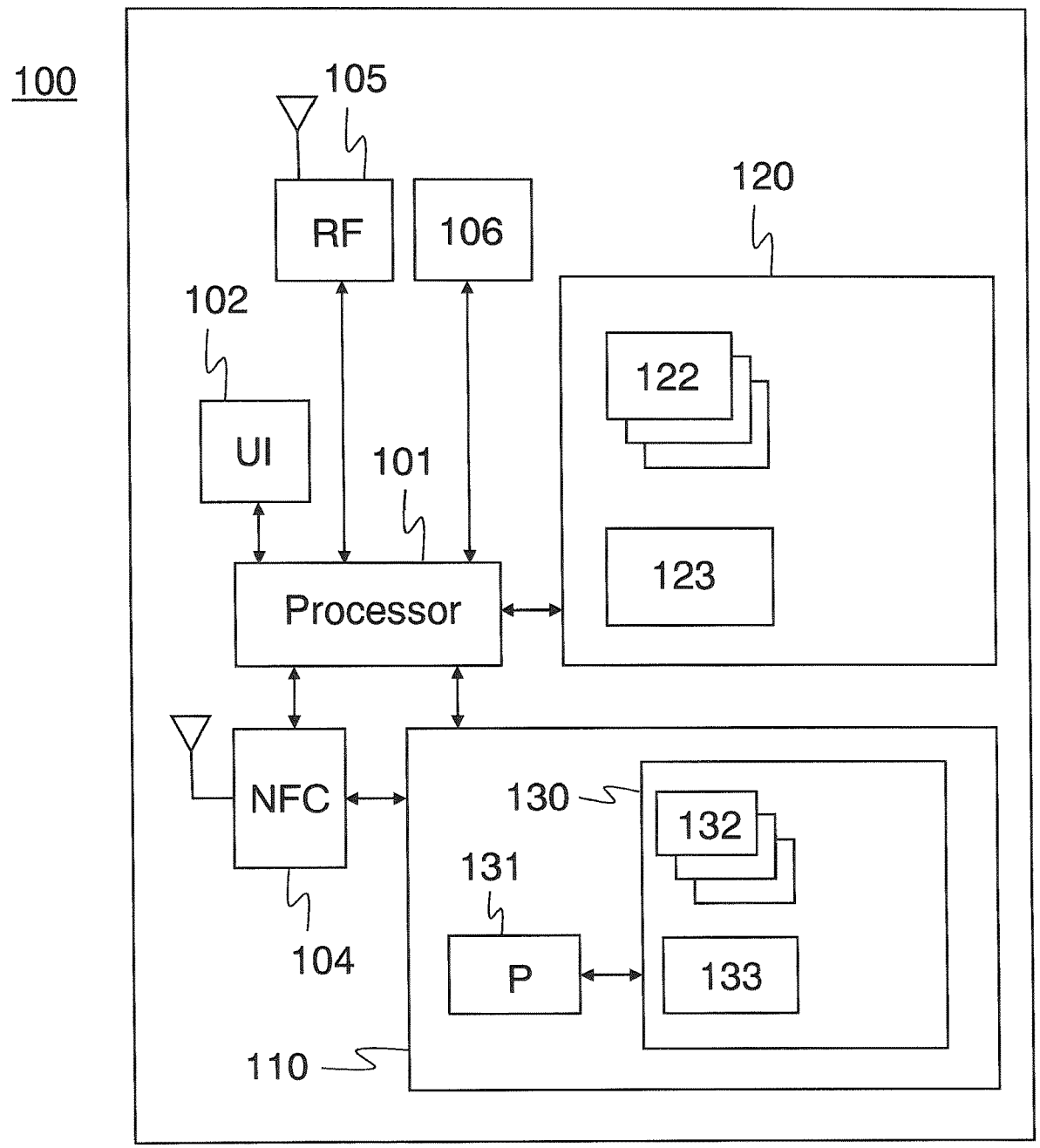
FIG. 1 shows an apparatus capable of hosting a secure module in accordance with an embodiment of the invention.

FIG. 1 shows an apparatus capable of hosting a fixed or detachably attachable secure module according to an embodiment of the invention. The apparatus 100 comprises a processor 101, memory 120, and software stored into the memory 120. The software comprises program code containing instructions which the processor 101 executes in order to control the operation of the apparatus 100. The software comprises an operating system or firmware 123 and applications 122. In an embodiment, the apparatus 100 is a mobile terminal or mobile phone.

The apparatus 100 may comprise a user interface 102 coupled to the processor 101. The user interface 102 typically comprises at least a keyboard and a display.

The apparatus 100 further comprises a secure module or element 110 which comprises a processor 131, memory 130, and software stored into the memory 130. The software comprises an operating system 133 and one or more secure module applications 132. In an embodiment, the secure module 110 is a smart card or chip permanently integrated, detachably attached or removably mounted into the apparatus 100. The secure module may be a Java card (having Java operating system). In case of Java cards, the secure module applications(s) 132 may be called applets. In an embodiment, the apparatus comprises a smart card slot in which the secure module 110 can be fed. In an embodiment, the secure module 110 is a subscriber identity module (SIM). Normally, any secure module 110 should be tamper-resistant.

The secure module hosting apparatus 100 is configured to provide connectivity to the secure module 110. In practice, the apparatus 10 can include a smart card interface or interface module (not shown) which is in contact with secure module's physical pin connectors. The interface can be coupled to the processor 101 via a data bus (not shown). The secure module 110 can define different security levels for different information contained in the secure module 110. The apparatus 100 can request information via the interface from the secure module 110. Depending on what is the security level of the requested information, the secure module 110 delivers the requested information to the hosting apparatus 100. For this purpose, the secure module 110 may comprise, for example, a security checking module or a corresponding function (not shown). This module may be implemented by software or a suitable combination of software and hardware. It classifies different information in different security levels and checks whether a requester (for example, the hosting apparatus 100 or apparatus software) has appropriate rights to receive requested information from the secure module 110. According to an embodiment, the security checking is implemented by the operating system 133 of the secure module 110.

The secure module application(s) 132 may comprise, for example, a payment application or a ticketing application. It is run by the secure module processor 21. The secure module 110 comprises an interface for enabling accessing the (typically passive) secure module from outside. This interface may be provided by suitable arrangements using software and/or hardware and/or physical arrangements, such as pin connectors.

The user of the apparatus 100 may interact with secure module application(s) 132 by using a dedicated counterpart application (user interface application) which is included in within the applications 122 and is run by the processor 101. In case the corresponding secure module application 132 may be called an applet, the counterpart application 122 may be called a midlet. An applet here generally means a tailored application installed, residing and to be run in a secure module. An applet may be a Java card applet. A midlet here generally means a small application to be installed in an electronic device. A midlet may be a small Java application. The user interface application 122 implements a user interface for the corresponding secure module application 132. In that way the user interface 102 (typically a keyboard and a display) of the apparatus 100 can be used as a user interface for the secure module application 132 concerned. By means of the user interface application 122 the user can generally control the corresponding at least one secure module application 132 residing at the secure module 110. With the aid of the user interface application 122 the user may, for example, activate the at least one secure module application 132, use the at least one secure module application 132, and/or close the at least one secure module application 132 after use.

The apparatus 100 may further comprise a near field communication module 104 with an antenna. The near field communication module 104 is connected to the processor 101 and to the secure module 110. In an embodiment, the near field communication module 104 is an RFID communication module, such as, for example an RFID reader. An external device, such as a point-of-sale terminal or a contactless reader (not shown in FIG. 1), may communicate with the secure module 110 via the near field communication module 104. The near field communication module 104 may operate in an active or passive mode. In an active mode, the near field communication module 104 and another active near field communication module both generate their own radio frequency fields to transfer data. In a passive mode, only one of the near field communication modules generates the radio frequency field. The other near field communication module functions as a "read-only module", a tag which does not actively transmit. This mode may also be called a tag mode.

For communication with a cellular telecom network, the apparatus 100 may further comprise a cellular radio transceiver 105 with an antenna. The cellular radio transceiver 105 is coupled to the processor 101. The apparatus 100 may further comprise interface(s) 106 for short-range communications, other than the near field communication described in the preceding, such as Bluetooth, WLAN (Wireless Local Area Network), UWB (Ultra Wideband), and/or infrared communications.

In an embodiment of the invention, it has been observed that secure element counterpart applications 122 (such as user interface applications and other applications critical to managing the secure module) should be handled differently than other applications or midlets 122 comprised in the apparatus memory 120 are handled. By implementing this, as an example, unintentional removal of counterpart applications 122 by the user can be avoided in many cases.

In accordance with an embodiment, the hosting apparatus 100 handles user interface applications (or midlets) 122 and other counterpart applications differently from regular applications. In this embodiment, the apparatus 100 handles different applications on the basis of different installation or application classes. The apparatus 100 implements a separate installation or application class for secure module counterpart applications (of which the user interface application here presents an example). Based on the class, the hosting apparatus software marks any counterpart application. If the user tries to delete, move or otherwise amend the counterpart application, the hosting apparatus software prevents this.

According to one embodiment of the invention the user has no control to the counterpart application other than to use it.

Depending on the implementation, it may be indicated to the user which applications belong to the separate application class that contains secure module related applications.

Figure 2A:
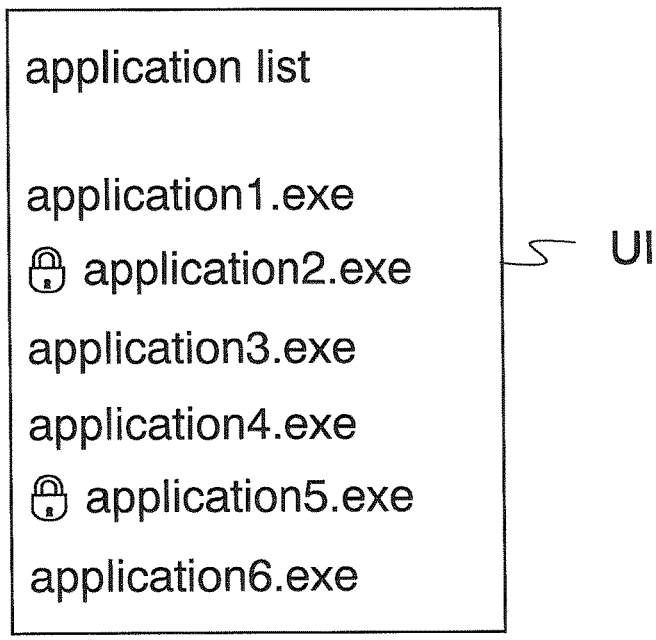
FIG. 2a illustrates a cursory appearance of a user interface in accordance with an embodiment of the invention.
Figure 2B:
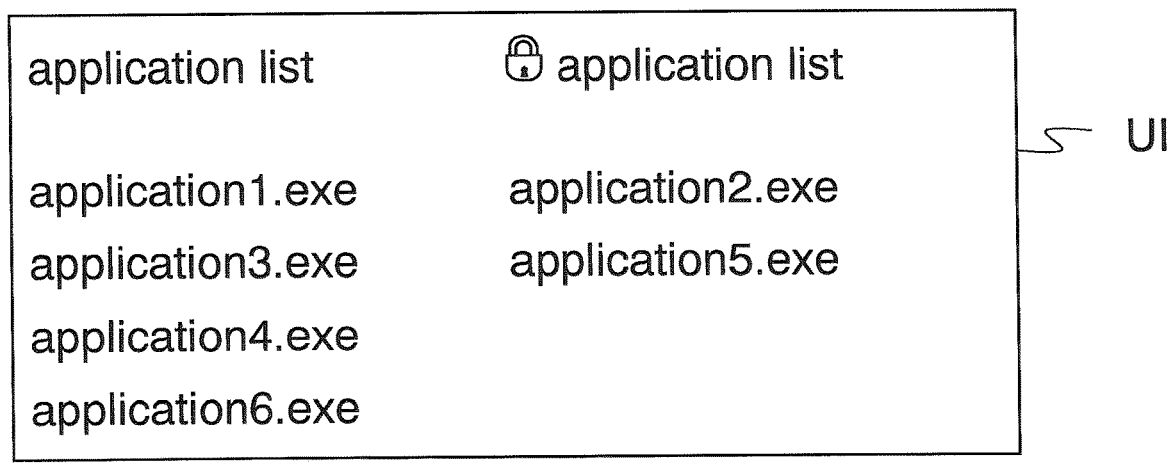
FIG. 2b illustrates another cursory appearance of a user interface in accordance with an embodiment of the invention.

FIG. 2a illustrates a cursory appearance of the user interface 102, on which the user sees a list of applications present in the hosting apparatus 100. This may be the contents of a visible folder ("Collections" folder or similar) comprising different midlets. Secure module related applications or midlets are indicated with the aid of a lock symbol in the list. FIG. 2b illustrates another cursory appearance of the user interface 102. In this example, the midlets belonging to the secure module related application class are shown in a list which is separate from the list showing regular midlets. In another implementation, the secure module related applications may be hidden from the user by defining them as hidden files. Now, if the user for example tries to delete one of the secure module related applications, the apparatus software does not automatically let it happen. Instead, it may for example prompt for the user a message on the user interface (display), the message indicating that deletion of the file containing the application is not allowed. In an alternative embodiment, the user may be granted a permission to delete the application, however not directly but only after a further step (or steps). The purpose of the further step is to assure that the user does not accidentally (or unintentionally) delete the application. The further step may comprise interaction with the user. For example, the user may be first warned by a warning message, displayed on the user interface, informing the user of the consequence of deletion and requesting the user to confirm that the application is really to be deleted and that such operation is not recommended. The application is deleted only after a confirmation is received from the user and only after any other specified further condition is fulfilled, such as for example requesting the user to perform certain additional steps to get the final permission to delete the application, such as requesting, e.g., a user authentication PIN code or like from the user.

Figure 3:
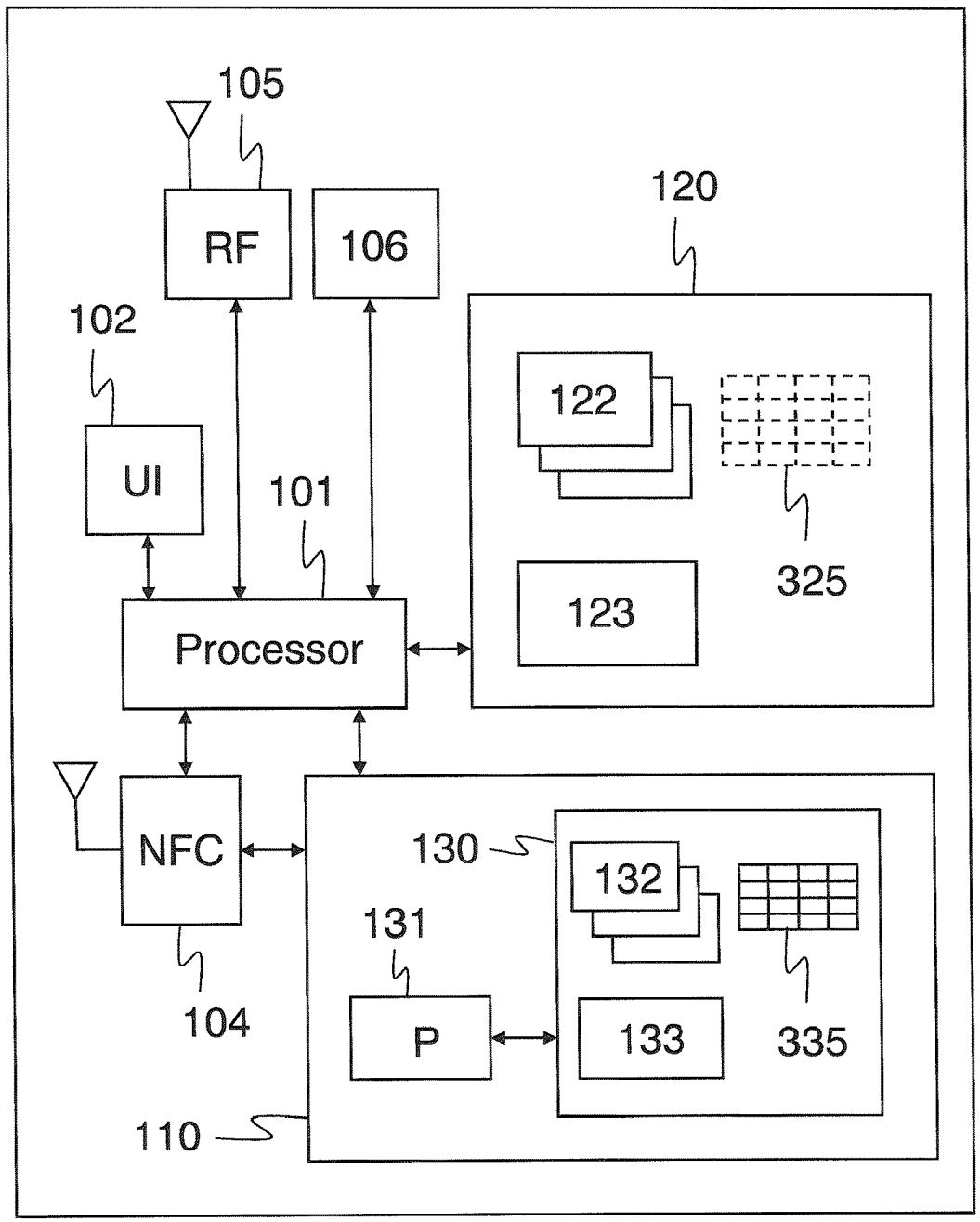
FIG. 3 shows an apparatus in accordance with another embodiment of the invention.

FIG. 3 shows an apparatus in accordance with another embodiment of the invention. The apparatus 300 corresponds to the apparatus 100 in most of its technical aspects. Same reference numbers have been used to indicate similar parts or functions.

The apparatus shown in FIG. 3 makes use of the registry or database 335 arranged in the memory 130 of the secure module 110. One such registry has been disclosed in the international patent application PCT/FI2006/050383 by the inventor of the present application.

The secure module 110 has the registry table or database 335. The registry 335 can be implemented as a separate application into a secure element chip. Alternatively, the functionality can be implemented into the secure module operating system 133. In the registry is maintained information on installed secure module applications 132 and the counterpart applications 122. For each secure module application 132 the registry contains information identifying the counterpart application 122 which is required to be present in the hosting apparatus 300. This information can be presented in various ways. For example, this information may comprise the name (or some other identifier) and version number of the required counterpart application 122. In an alternative embodiment the registry 335 contains information of both the name and the vendor. In an alternative embodiment the registry 335 contains instructions on how to install/update the required counterpart application 122. If the apparatus does not have the required counterpart application 122 or the required version of the application, an installation or update can be performed by following the instructions. Said instructions may comprise for example the address of a network resource from which the application or update can be downloaded. This address may be in the form of an URL (Uniform Resource Locator).

FIG. 4 illustrates an embodiment of the registry 335. In this embodiment, the registry 335 contains for each secure module application 132 (identified for example by an application and version identifier) information identifying the exact compatible counterpart application 122 (name and version), and the network site from which this application or update can be downloaded.

In an embodiment, the operating system or firmware 123 of the hosting apparatus 300 (FIG. 3) retrieves information contained in the registry 335 and stores this information into memory 120. In an embodiment, this information contains information indicating the correspondence of secure module applications and counterpart applications. In an embodiment, a replica 325 of the registry 335 is written in the memory 120 of the hosting apparatus 300. The firmware 123 of the hosting apparatus 300 may from time to time check the contents of the registry 335 and update its replica 325 accordingly. Typical situations of checking and updating are apparatus start-ups and situations in which the secure module 110 is activated for different purposes, such as for payment and/or ticketing purposes. If the power of the secure module 110 has been down for a long time, the firmware 123 may be configured to power the module 110 and check the contents of registry 335. This can be done occasionally, for example in several hours' interval. Using the information originating from the registry 335 the hosting apparatus software applies special restriction measures to the secure module counterpart applications or midlets 122. For this purpose, the existence of data in the registry 335 which links a secure module application 132 and a corresponding counterpart application 122 in itself can be interpreted by the hosting apparatus as an indication to apply said restriction measures. Additionally, the registry 335 may contain further data (for example a further column or parameter set) directly or indirectly indicating that user right restriction measures should be applied concerning the counterpart application. In an embodiment, the registry may contain contains an express indication in the registry or table (e.g., a flag, bit pattern, parameter or attribute value or text) indicating that the counterpart application should be treated as "non-editable" or similar.

These may comprise various security measures, deletion protection measures and installation or update restrictions. If the counterpart application is, for example, a user interface application, the hosting apparatus software may prevent the user to unintentionally delete the counterpart application.

Figure 5:
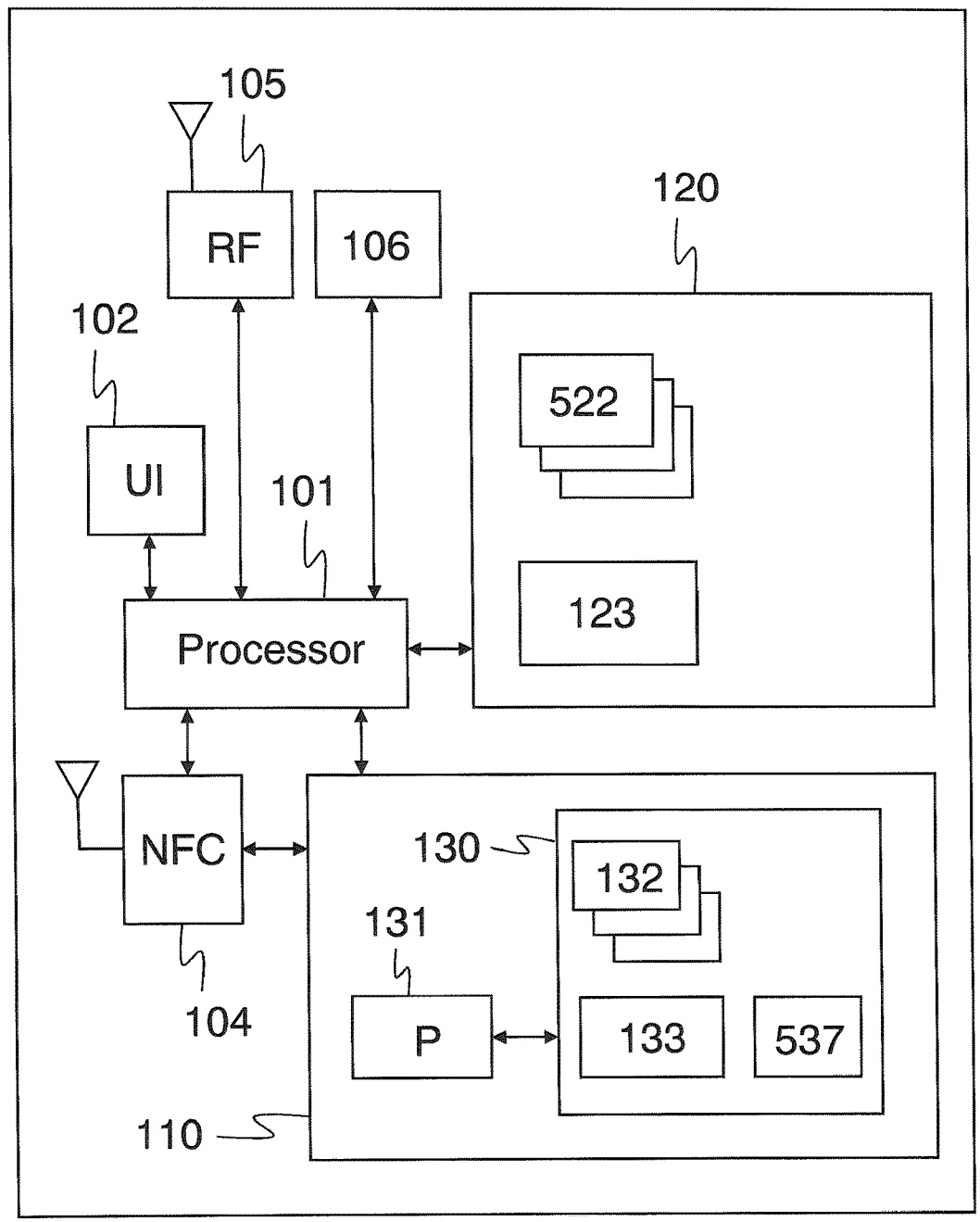
FIG. 5 shows an apparatus in accordance with yet another embodiment of the invention.

FIG. 5 shows an apparatus in accordance with yet another embodiment of the invention. The apparatus 500 corresponds to the apparatuses 100 and 300 in most of its technical aspects. Same reference numbers have been used to indicate similar parts or functions.

The apparatus shown in FIG. 5 makes use of security domains. Typically, mobile apparatuses recognize a set of security domains. In case of mobile apparatuses these may involve a manufacturer domain, an operator domain, trusted third party domain(s) and untrusted security domain(s). The first three (manufacturer, operator and trusted third party domains) require a recognizable certificate chain to be matching with apparatus resident root certificates. An apparatus can grant specific permissions for an application if the application is signed by a recognizable certificate holder.

In an embodiment, access to the secure module 110 is controlled by using a defined trusted third party security domain (referred to as a secure module access domain). In an embodiment, a root certificate 537 of the secure module access domain may be stored within the secure module memory 130. Depending on the implementation, the root certificate 537 may be stored alternatively in the general memory 120 of the hosting apparatus or in both places. In an embodiment, it is a condition for an application residing outside the secure module 110 that in order to access the secure module 110, the application must have a signature matching the secure module access domain. In other words, a secure module counterpart application 522 is permitted to access the secure module 110 if the counterpart application 522 is signed by a security domain signature which matches the secure module access domain (or has a recognizable certificate chain to the root certificate 537). For these purposes, a Java security domain signature can be used, for example.

If the secure element counterpart application 522 has a signature matching the secure element security domain, the hosting apparatus can apply security measures based on the signature. Based on the fact that the midlet has a matching signature, the hosting apparatus software can mark any counterpart application. If the user tries to delete, move or otherwise amend the counterpart application, the hosting apparatus software prevents this. Instead, it may for example prompt for the user a message on the user interface (display), the message indicating that amending the file in question is not allowed. In an alternative embodiment, the user may be granted a permission to delete the application, however not directly but only after a further step (or steps) has been taken and/or a further condition has been fulfilled similar to what has been described in the preceding.

Figure 6:
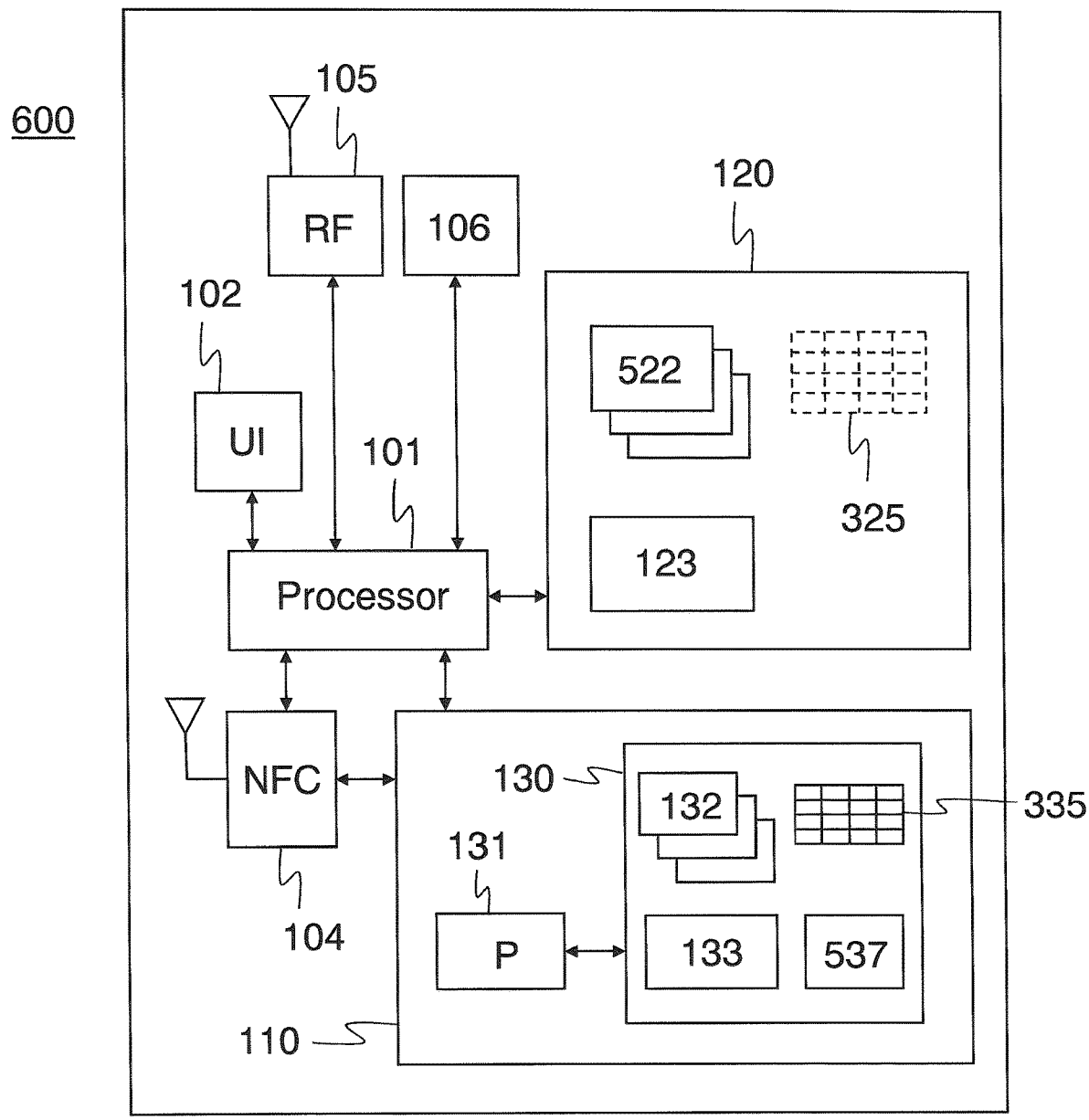
FIG. 6 shows an apparatus in accordance with yet another embodiment of the invention.

Embodiments presented in connection with FIGS. 1, 3 and 5 may be considered to be independent of each other. However, they may also be used in any suitable combination. One exemplary combination is shown in FIG. 6. The apparatus 600 implements the additional security domain for restricting the access rights of midlets 522 accessing the apparatus resident secure element 110. The root certificate 537 is stored in the secure element memory 130. Apparatus software contained in the memory 120 manages the midlets 522 so that it enforces rules of the additional security domain for accessing the secure module from a midlet 522. The secure element 110 has the registry 335 containing data of secure module applications 132 and their corresponding counterpart applications or midlets 522. The apparatus software monitors the secure module registry 335. When a secure module application 132 is installed and the installation has made a record into the registry 335, the hosting apparatus 600 prompts the user to install the compatible counterpart application 522, and upon permission, performs the installation. Similarly, when a secure module application 132 is updated and the update has made a record into the registry 335, the hosting apparatus 600 prompts the user to update the compatible counterpart application 522, and upon permission, performs the update. The apparatus software writes a replica 325 of the registry 335 in the memory 120 of the hosting apparatus 600, or otherwise obtains information of secure module applications 132 and corresponding counterpart applications 522. Using the information originating from the registry 335 the apparatus software applies special restriction measures (e.g., deletion protection) to the secure module counterpart applications or midlets 522. When a secure module application 132 is removed the apparatus software deletes the counterpart application 522 accordingly. Similarly, when a secure module application 132 is invalidated, by the card issuer or application issuer, the apparatus software deletes or invalidates the counterpart application 522 accordingly.

According to an embodiment, the user is substantially provided no other control to the counterpart application or midlet 522 but to use it. The management of such counterpart applications or midlets 522 is arranged to follow the same logic as the management of corresponding secure element applications 132 themselves.

In an alternative embodiment, it is arranged that the secure module registry allows (directly or indirectly) a choice between multiple counterpart applications (e.g., user interface applications). The user can be provided with the option to choose one or more than one (or even all) counterpart applications to be installed. In an embodiment, the hosting apparatus software is arranged to handle all of those as described in the preceding. In another embodiment, the apparatus software is arranged to treat the set of alternative counterpart applications as described in the preceding, but to allow the user to install and delete individual midlets as long as there is at least one compatible midlet available for acting as a counterpart for each secure module application.

Figure 7:
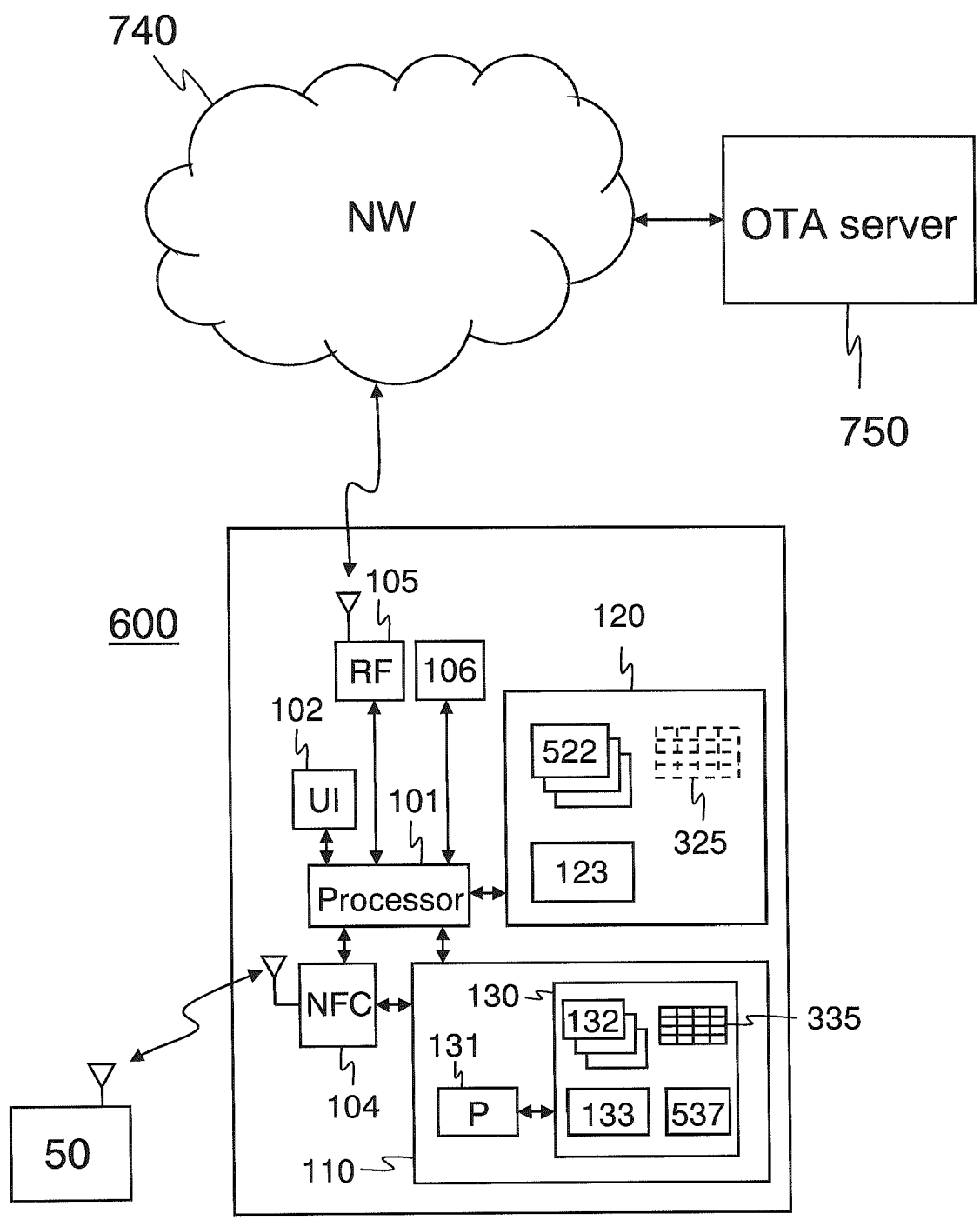
FIG. 7 shows different routes of communication for an apparatus in accordance with an embodiment of the invention.

FIG. 7 shows different routes of installing and/or updating applications in an apparatus according to an embodiment of the invention. According to one alternative, a secure module application or application update is installed via a contactless method using a near field communication link. The application and/or installation file or commands are transferred from a contactless reader 50 over the near field communication link to the near field communication module 104 and therefrom to the secure element 110 in which the installation is carried out. According to another alternative, the secure module application or application update is installed via on-the-air (OTA) installation method. In this alternative, the application and/or installation file or commands are transferred from a secure on-the-air server 750 via communications network 740 to the apparatus 600 using a cellular network connection-oriented or connectionless communications service. The application and/or installation file or commands are received by the cellular radio transceiver 105 which puts them forward for secure module application installation.

In more detail, the installation by the OTA method may be implemented for example according to the following exemplary embodiment. First a secure connection (secured by a secret key, for example) is established between the secure module 110 and the secure server 750. After connection establishment the secure server 750 issues application installation commands to control secure module application 132 installation (or update). The secure module application 132 is installed (or updated) on the basis of the installation commands. In case there exists the registry (or directory) 335 in the secure module 110, the registry 335 is updated with the installation information either by OTA commands or implicitly by the secure module operating system 133.

Thereafter a corresponding counterpart application 122, 522 is installed (or updated) in the hosting apparatus in response to instruction(s)/command(s) received from the server 750. Alternatively, as disclosed in the international patent application PCT/FI2006/050383, the hosting apparatus can check from the secure module 110 whether an installation (or update) is needed and perform the installation (or update) accordingly. In an embodiment, the registry 335 identifies the counterpart application(s) 522 for the secure module application(s) 132. The registry 335 that way provides the hosting apparatus with an indication as to which applications or midlets 522 the hosting apparatus should treat as secure module related applications (for example, to which applications the hosting apparatus software should apply the special restriction measures mentioned in the foregoing).

In case there exists no registry linking the secure module applications 132 and counterpart applications 522 together, the server 750 can earmark the counterpart applications 522 during installation (or update) so that the hosting apparatus understands that said applications are secure module related applications to which it should apply the special restriction measures.

Figure 8:
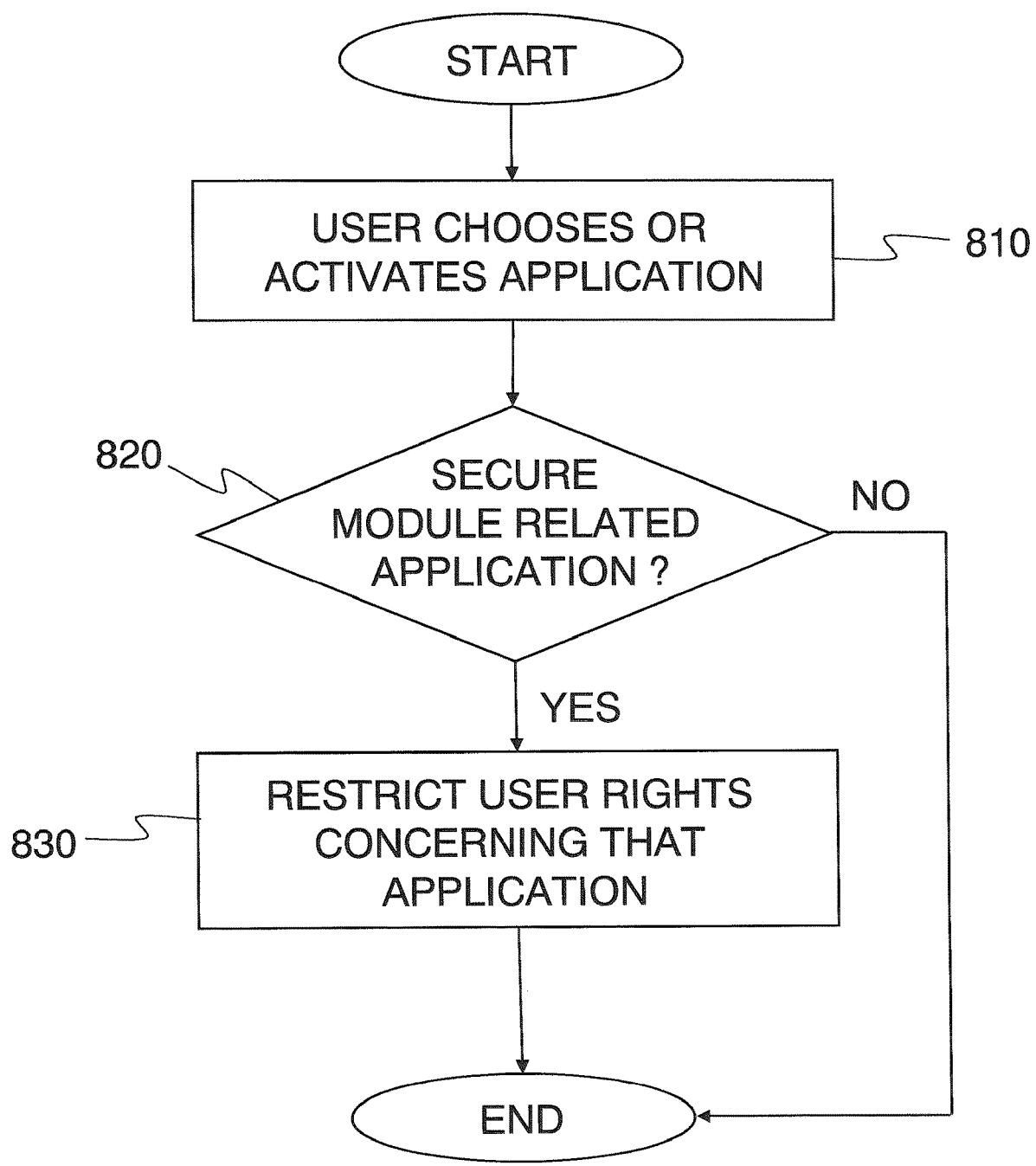
FIG. 8 shows a flow chart in accordance with an embodiment of the invention.

FIG. 8 shows an exemplary flow chart in accordance with an embodiment of the invention. In step 810 the user of the apparatus chooses a hosting apparatus resident application 122 via the user interface 102 or otherwise activates the application 122 via the user interface 102 (e.g., performs any kind of manipulation attempt in order to remove or amend the application 122 so that the application 122 would not anymore function properly after such a manipulation). In step 820 the processor 101 checks whether the application 122 is a secure module related application (i.e., counterpart application or similar). This can be checked, depending on the implementation, from the registry replica 325, or otherwise from the memory 120 if the application has been marked in the memory 120 in accordance with embodiments presented in the foregoing description. If YES, the processor 101 applies restriction measures (e.g., deletion protection) in step 830 in order to restrict user's rights. If NO, then the restriction measures are not applied.

Various embodiments of the invention have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. An apparatus comprising:
a near field communication module configured to provide a contactless interface for the apparatus to communicate with other devices when within close-to-touch range;
an interface to a secure element hosted by the apparatus, the secure element comprising a processor and a memory, the memory of the secure element storing one or more secure element applications, the one or more secure element applications comprising one or more applications for conducting transactions via the near field communication module;
a memory configured to store a plurality of applications at the apparatus;
a user interface configured to provide access to the plurality of applications stored in the memory to a user of the apparatus; and a processor configured to check whether an application stored in the memory of the apparatus and chosen by the user of the apparatus via the user interface is a counterpart application for any of the one or more secure element applications stored in the memory of the secure element hosted by the apparatus, a counterpart application being configured to allow the user of the apparatus to interact with a corresponding secure element application, wherein the processor of the apparatus is further configured to, when determined from the checking that the application chosen by the user of the apparatus via the user interface is a counterpart application for any of the one or more secure element applications, restrict a user's rights to the counterpart application chosen by the user of the apparatus via the user interface by applying a security measure comprising preventing at least one of deletion, installation or updating of the chosen counterpart application via the user interface.

2. An apparatus according to claim 1, wherein the counterpart application is a secure element user interface application or another secure element managing application.

3. An apparatus according to claim 1, wherein the processor of the apparatus is configured to restrict user rights by implementing a separate application class for counterpart applications for any of the one or more secure element applications.

4. An apparatus according to claim 1, wherein the secure element application comprises a payment application or a ticketing application.

5. A method, comprising:
providing connectivity to a secure element hosted by an apparatus, the secure element comprising a processor and a memory, the memory of the secure element storing one or more secure element applications, the one or more secure element applications comprising one or more applications for conducting transactions via a near field communication module configured to provide a contactless interface for the apparatus to communicate with other devices when within close-to-touch range;
storing, in a memory of the apparatus, a plurality of applications;
providing access to the stored plurality of applications to a user of the apparatus via a user interface;
checking, by a processor of the apparatus, whether an application stored in the memory of the apparatus and chosen by the user of the apparatus from the stored plurality of applications via the user interface is a counterpart application for any of the one or more secure element applications stored in the memory of the secure element hosted by the apparatus, a counterpart application being configured to allow the user of the apparatus to interact with a corresponding secure element application; and
when determined from the checking that the application chosen by the user of the apparatus via the user interface is a counterpart application for any of the one or more secure element applications, the processor of the apparatus restricting a user's rights to the counterpart application chosen by the user of the apparatus via the user interface by applying a security measure comprising preventing at least one of deletion, installation or updating of the chosen counterpart application via the user interface.

6. A method according to claim 5, wherein the counterpart application is a secure element user interface application or another secure element managing application.

7. A method according to claim 5, wherein the method comprises restricting user rights by using a separate application class for counterpart applications for any of the one or more secure element applications.

8. A method according to claim 5, wherein the method comprises:
writing data from a replica of a secure element resident registry into the memory of the apparatus, and
using said data or replica in said checking whether an application is a counterpart application for any of the one or more secure element applications.

9. A method according to claim 5, wherein the secure element application comprises a payment application or a ticketing application.

10. A computer program product comprising: computer executable program code stored in a non-transitory computer readable storage medium, which when executed by a processor of an apparatus causes the apparatus to perform:
providing connectivity to a secure element hosted by the apparatus, the secure element comprising a processor and a memory, the memory of the secure element storing one or more secure element applications, the one or more secure element applications comprising one or more applications for conducting transactions via a near field communication module configured to provide a contactless interface for the apparatus to communicate with other devices when within close-to-touch range;
storing, in a memory of the apparatus, a plurality of applications;
providing access to the stored plurality of applications to a user of the apparatus via a user interface;
checking, by the processor of the apparatus, whether an application stored in the memory of the apparatus and chosen by the user of the apparatus from the stored plurality of applications via the user interface is a counterpart application for any of the one or more secure element applications stored in the memory of the secure element hosted by the apparatus, a counterpart application being configured to allow the user of the apparatus to interact with a corresponding secure element application; and
restricting, by the processor of the apparatus, a user's rights to the chosen application, when determined from the checking that the chosen application is a counterpart application for any of the one or more secure element applications, by applying a security measure comprising preventing at least one of deletion, installation or updating of the counterpart application chosen by the user of the apparatus via the user interface.

11. A computer program product according claim 10, further comprising computer executable program code, which when executed by the processor of the apparatus causes the apparatus to perform:
restricting user rights by using a separate application class for counterpart applications for any of the one or more secure element applications.

12. A computer program product according to claim 10, further comprising computer executable program code, which when executed by the processor of the apparatus causes the apparatus to perform:
writing data from a replica of a secure element resident registry into the memory of the apparatus, and
using said data or replica in said checking whether an application is a counterpart application for any of the one or more secure element applications.

13. A computer program product according to claim 10, wherein the secure element application comprises a payment application or a ticketing application.

* * * * *